United States Patent [19]

Šulc et al.

[11] Patent Number: 4,893,918

[45] Date of Patent: Jan. 16, 1990

[54] CONTACT OR INTRAOCULAR LENS FROM LIGHTLY CROSSLINKED POLYMER OR COPOLYMER OF 2-HYDROXYETHYL METHACRYLATE AND A METHOD FOR PRODUCING THEREOF

[75] Inventors: Jiří Šulc; Zuzna Krčova, both of Prague, Czechoslovakia

[73] Assignee: Ceskoslovenska Akademie Ved, Prague, Czechoslovakia

[21] Appl. No.: 141,622

[22] Filed: Jan. 6, 1988

[30] Foreign Application Priority Data

Jan. 12, 1987 [CS]  Czechoslovakia ............... 215-87

[51] Int. Cl.$^4$ ................................................ G02C 7/04
[52] U.S. Cl. .............................. 351/160 H; 351/160 R
[58] Field of Search ........................ 351/160 H, 160 R

[56] References Cited

U.S. PATENT DOCUMENTS

| | | | |
|---|---|---|---|
| 3,925,178 | 12/1975 | Gesser et al. | 351/160 H |
| 3,948,871 | 4/1976 | Butterfield, Jr. et al. | 351/160 H |
| 3,964,973 | 6/1976 | Hradil et al. | 525/54.1 |
| 3,978,164 | 8/1976 | Le Boeuf et al. | 351/160 H |
| 3,988,274 | 10/1976 | Masuhara et al. | 351/160 H |
| 4,054,624 | 10/1977 | Le Boeuf et al. | 351/160 H |
| 4,107,121 | 8/1978 | Stoy | 351/160 H |
| 4,121,885 | 10/1978 | Erickson et al. | 351/160 H |
| 4,131,696 | 12/1978 | Covington | 351/160 H |
| 4,143,949 | 3/1979 | Chen | 351/160 H |
| 4,163,608 | 8/1979 | Neefe | 351/160 H |
| 4,166,255 | 8/1979 | Graham | 351/160 H |
| 4,168,112 | 9/1979 | Ellis et al. | 351/160 H |
| 4,208,362 | 6/1980 | Deichert et al. | 351/160 H |
| 4,284,749 | 8/1981 | Neefe | 351/160 H |
| 4,338,419 | 7/1982 | Korb et al. | 351/160 H |
| 4,379,893 | 4/1983 | O'Malley et al. | 351/160 H |
| 4,569,858 | 2/1986 | Lim et al. | 351/160 H |
| 4,687,816 | 8/1987 | Lin et al. | 525/279 |
| 4,734,475 | 3/1988 | Goldenberg et al. | 525/326.5 |

FOREIGN PATENT DOCUMENTS 1401233  7/1975  United Kingdom .

*Primary Examiner*—Bruce Y. Arnold
*Assistant Examiner*—Terry S. Callaghan
*Attorney, Agent, or Firm*—Leydig, Voit & Mayer

[57] ABSTRACT

Contact lens or intraocular lens from lightly crosslinked polymer of 2-hydroxyethyl methacrylate or from such its copolymer, where the 2-hydroxyethyl methacrylate component prevails over the second nonhydrophilic component, which contains a hydrophilic swellable transparent surface layer and an inner portion of lower swellability than the surface layer, whereby the swellability of the surface layer decreases continuously from the exterior of the surface layer towards the inner portion to the swellability level of the inner portion.

The swellability of the exterior of the surface layer is at the surface layer of up to 98% and the thickness of the surface layer is at utmost 100 μm.

The finally shaped lense is treated with an alkaline reacting solution of a salt, in which the lens does not swell and the lens is then freed of all soluble substances by washing.

3 Claims, No Drawings

CONTACT OR INTRAOCULAR LENS FROM LIGHTLY CROSSLINKED POLYMER OR COPOLYMER OF 2-HYDROXYETHYL METHACRYLATE AND A METHOD FOR PRODUCING THEREOF

The invention pertains to hydrogel contact lens or intraocular lens from lightly crosslinked polymers of 2-hydroxyethyl methacrylate, or from such lightly crosslinked copolymers of 2-hydroxyethyl methacrylate where the 2-hydroxyethyl methacrylate units prevail over the units of other virtually non-hydrophilic monomers, and to a method for their production.

It is known that hydrogel contact lenses and intraocular lenses are best tolerated if they are softer than the living tissue against which they lean. However, the very soft lenses with the swelling capacity 60 to 90% of water have a low strength and are readily damaged by handling. The swelling capacity is to be understood here to be the content of water at equilibrium swelling at 20° C. In addition, the refractive index of light decreases considerably with the increasing content of water and the lenses made from these hydrogels need to be relatively thicker for higher dioptric values. Consequently, the advantage of a better penetration of atmospheric oxygen to cornea is again lost in part because the diffusion path is longer.

For the above purposes, the polymer of 2-hydroxyethyl methacrylate (HEMA) crosslinked with less than one percent of ethylene glycol dimethacrylate is hitherto mostly used. It has very good optical properties and sufficient mechanical properties, but the lenses made of it are very well tolerated only if they are perfectly smooth, because the material is harder than the surface of cornea. It was proposed therefore to partly saponify some parts of the inner surface of lens with alkaline hydroxide. The saponified places become strongly swellable, does not irritate the cornea, and take the lens away from the surface of cornea thus enabling a free circulation of tears and a sufficient supply of oxygen which is dissolved in tear liquid to the surface of the eye.

However, the local strong swelling is unsuitable for some designs of lenses, above all for intraocular, lenses. The invention relates to lenses which possess a softening of the surface layer of the lens, and if desired the inner portion, this being accomplished by treating the lens so as to form a very thin layer of strongly swollen soft gel, whereas the optical properties of poly-HEMA are retained.

The subject of invention is a contact lens, or an intraocular lens, from the lightly crosslinked polymer of 2-hydroxyethyl methacrylate, or from such a lightly crosslinked copolymer where the 2-hydroxyethyl methacrylate component prevails over the other nonhydrophilic component, which is characterized in that it contains a hydrophilic swellable transparent surface layer and an inner portion of lower swellability than the surface layer, whereby the swellability of the surface layer decreases continuously from the exterior of the surface layer towards the inner portion to the swellability level of the inner portion. The swellability of the surface layer is at its exterior of up to 98% and the thickness of the surface layer is at utmost 100 $\mu$m. The contact lens or intraocular lens according to the invention is characterized in that the surface layer is formed by alkaline hydrolysis.

The copolymer containing at least 50% of 2-hydroxyethyl methacrylate units and at utmost 50% units of a nonhydrophilic monomer comprising $C_1$ to $C_6$-alkyl esters of methacrylic and acrylic acid, acrylonitrile, methacrylonitrile, vinyl esters of aliphatic caroxylic acids, styrene, and vinylcarbazole may be advantageously used.

The method for production of contact lenses or intraocular lenses according to the invention comprises treating of a finally shaped lens by an alkaline reacting solution of salt in which the lens does not swell and the subsequent removing of all soluble substances from the lens by washing. However, the procedure where the lens in part swollen with water or aqueous solution is immersed into a warm, alkaline reacting solution of salt may be also applied.

The procedure according to the invention comprises partial saponification of a very thin surface layer of poly-HEMA using concentrated solutions of salts in which poly-HEMA swells only slightly or not at all and which have an alkaline reaction as such or with addition of a strongly alkaline compound, above all alkaline hydroxide. The finally shaped lenses are immersed into these warm solutions for a short time, for example, for several minutes, then are freed of salts and alkaline substances by washing and immersion into physiologic saline. The lens may be before immersion into the salt solution either completely unswollen in the form of xerogel or may exhibit an arbitrary degree of swelling. It proved suitable to use the lenses swollen with water or other liquid to equilibrium for this processing without an undesirable gradient occurring between both materials, i.e. between the partially hydrolyzed surface layer and the bulk mass of lens. The very thin strongly swollen surface layer adheres very well to the lens even without a perceptible transition gradient which is in the case of thicker surface layers necessary. Thickness of the partially saponified layer in the completely swollen state is about 10 to 100 $\mu$m.

It was also revealed in a striking way, that such a thin layer removes irritation of cornea and, in addition to this, levels the unevenness of lens which are very small in the swollen state and visible only with a microscope, thus increasing the comfort of patient very much.

Numerous salts can be used which are soluble in water to concentrated solutions in which poly-HEMA does not swell and, on the contrary, deswells if it is swollen. Such salts are, for example, alkaline salts of strong mineral acids, as sodium sulfate or phosphate (normal trisodium phosphate), alkali metal carbonates and hydrogencarbonates, alkaline salts of some organic acids, for example, sodium acetate, and others. Also mixtures of two or more salts can be employed. Applicable also are the salts of alkaline earth metals, e.g. calcium or magnesium chloride.

To attain the alkaline reaction, an arbitary strong base, e.g. sodium hydroxide, is added. The salts, which are strongly alkaline in aqueous solutions, for example, metal carbonates or sodium phosphate, may be used also without addition of stronger bases, but this is not advantageous because the reaction time is extended. If a transition gradient is formed, it is limited to such a thin layer that the optical properties of lens are not perceptibly affected but causes the perfect bonding which is not damaged even at high difference of swelling.

Another advantage of a very thin strongly swellable surface layer is the reduced coefficient of friction between the lens and eye tissue, so that the lens assumes rapidly and spontaneously the prescribed centric position given by the geometry. This position is stable, because the lens instantly returns to it after any short-term displacement. The strongly swollen surface layer also protects the lens from deposition of proteins and other less transparent particles on the surface of the lens, so that the lens remains permantly transparent. This fact is particularly important for intraocular lenses.

The processing is advantageously carried out at temperature above 50° C., at best around 100° C., where the reaction time is very short. The upper limit is the temperature at which vapor bubbles could be formed inside the lens and damage the lens. However, this limit is not achieved even near the boiling point of salt solution, e.g. at 120° to 130° C. The processing temperature of the lenses may be defined according to the invention as a temperature between 50° C. and boiling point of the salt bath. The highly swellable exterior layer remains very thin even at such high temperature, because the hydrogel does not swell in the hot solution of salt but, on the contrary, it deswells if it was previously swollen with water or aqueous liquid.

If the processing with the alkaline reacting solution of salt is carried out at higher temperature under elevated pressure, the formation of vapor bubbles in the hydrogel is reliably avoided. However, suitable results can be reliably attained even by processing of the lenses at atmospheric pressure.

EXAMPLE 1

A dry intraocular lens from the lightly crosslinked poly-HEMA is immersed into aqueous solution containing 5 wt. % of sodium hydroxide and 50 wt. % of potassium carbonate at the temperature of solution 110° C. for 5 minutes. The lens is then rinsed and allowed to swell to equilibrium in distilled or deionized water. The resulting lens contains 70 to 98% of water in its surface layer which is 20 to 30 μm thick, whereas the swelling of bulk of the lens remains 30 to 40% as originally. The swelling capacity of surface layer decreases to 60 to 65% by immersion into physiologic saline, i.e. it is still at least 50% higher than of the original hydrogel. The surface of lens is substantially smoother and softer than before processing, optical properties remain unchanged.

EXAMPLE 2

A contact lens from the lightly crosslinked poly-HEMA, which is swollen with water to equilibrium, is immersed for 5 minutes into a saturated solution of $Na_2SO_4$ containing 10% of NaOH and heated to 100° C. The lens is then rinsed with distilled water. The result attained is practically the same as in example 1.

EXAMPLE 3

The procedure according to example 1 is repeated with the distinction that a lens swollen with water and saturated solution of potassium carbonate without addition of alkaline hydroxide is used, temperature of salt bath is increased up to the beginning of boiling, and the processing time is extended to 10 minutes. The result is similar to that in example 1.

EXAMPLE 4

An intraocular lens from the copolymerization of 85% HEMA with 15% of methyl methacrylate, crosslinked with 0.5% of ethylene glycol dimethacrylate, was used in the procedure according to example 1. The formed high-swelling surface layer remained transparent, while immersion of the same lens into a 5% hot sodium hydroxide solution caused a white cloudiness and the saponification affected the whole depth of lens without formation of a sharply limited partially saponified surface layer.

We claim:

1. A method for producing a contact or intraocular lens comprising treating a shaped lens comprised of a lightly crosslinked 2-hydroxyethyl methacrylate polymer or a lightly crosslinked 2-hydroxyethyl methacrylate copolymer in which at least 50 percent of the monomer units are 2-hydroxyethyl methacrylate units, and the remaining monomer units are of non-hydrophilic comonomer, with an alkaline-reacting solution of a salt which will not cause the lens to swell for a time sufficient to form a hydrophilic-swellable and transparent partially saponified portion on said lens, and subsequently freeing the lens of all soluble substances by washing.

2. The method for producing a contact or intraocular lens according to claim 1, wherein the swellability of the lens continuously decreases from the surface toward an inner non-saponified portion until the swellability is equal to that of the inner non-saponified portion.

3. The method of producing a contact or intraocular lens according to claim 2, wherein the swellability of the partially saponified portion of the lens is up to 98 percent and the approximate depth at which the swellability equals that of the non-saponified inner portion is not greater than 100 microns.

* * * * *